Figures 1, 2:
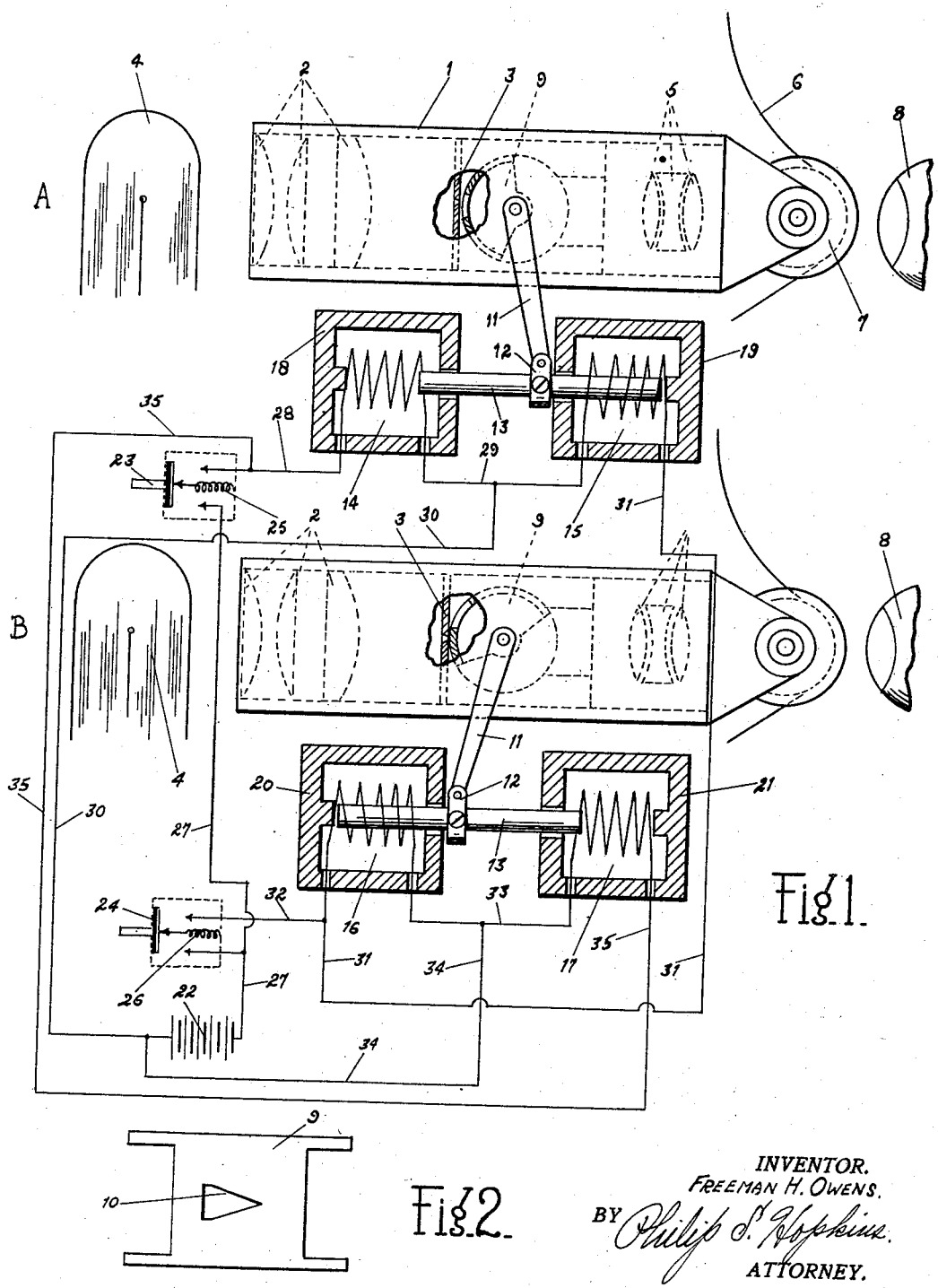

June 7, 1932.  F. H. OWENS  1,862,062
SOUND REPRODUCING APPARATUS
Filed Sept. 9, 1929

INVENTOR.
FREEMAN H. OWENS.
BY Philip S. Hopkins
ATTORNEY.

Patented June 7, 1932

1,862,062

UNITED STATES PATENT OFFICE

FREEMAN H. OWENS, OF NEW YORK, N. Y., ASSIGNOR TO OWENS DEVELOPMENT CORPORATION, OF NEW YORK, N. Y., A CORPORATION OF NEW YORK

SOUND REPRODUCING APPARATUS

Application filed September 9, 1929. Serial No. 391,379.

This invention relates to improvements in sound reproducing apparatus, the principal object of the invention being to provide efficient means whereby the respective sound records on film reels passing through a pair of cooperating machines may be alternately dissolved or faded in or out of projection.

As is well known, the projection booths of most theatres are equipped with two projector machines so that when a film reel is running through one the other may be loaded with the next reel and started as the first projector is finshing its reel. Nowadays, of course, these projectors are equipped with sound reproducing attachments for talking pictures. To permit this change over from one projector to the other, the film reel in the second projector must have at its beginning several feet of picture images identical with those on the last few feet of the reel in the first projector. While these last few feet of reel of the first projector are being projected to the screen, the second projector is started and the images from the first reel are faded out simultaneously as the images at the beginning of the second reel are faded in. The images being the same, this fading operation is not preceptible on the screen. Obviously, as soon as the reel in the second projector has been faded in and is operating the first projector has been faded out and can be stopped for the purpose of changing the reel, that is, inserting the third reel. This fading arrangement consists in a shutter or diaphragm operated to uncover the exposure aperture of the second projector synchronously with the covering of the exposure aperture of the first projector.

The present invention provides a fading means for the sound attachments of the two projectors which comprises shutter devices located within the sound reproducing units, whereby the sound record carried by the film in one machine will be faded in simultaneously with the fading out of the sound record carried by the film in the other machine.

In the drawing accompanying this specification,

Figure 1 is a partly sectional, diagrammatic side view of a pair of sound reproducing devices embodying the features of the present invention, certain elements of the reproducers being shown broken away; and Figure 2 is a detail plan view illustrating a development of the dissolving shutter drum.

Referring to the drawing, A and B designate a pair of duplicate sound reproducing apparatus, each comprising a housing 1 in which are disposed a condenser lens system 2, a slit partition 3, through the slit of which rays of light from a suitable source such as a lamp 4 are projected by the condenser lens on to a focusing lens system 5, which in turn focuses said light rays on the record-carrying portion of a film 6 traveling over a roller film support 7, the rays so modulated by their passage through the sound record being caught by a suitably placed light sensitive element such as a photo electric cell 8, all as fully described in my contemporaneously pending application Serial No. 360,871.

As hereinbefore stated, the object of the present invention is to fade out the sound record in one reproducing apparatus simultaneously with the fading in of the sound record in the other apparatus. To this end, each apparatus is provided with a fading means comprising a shutter of similar construction to that shown and described in my copending application Serial No. 360,247, which shutter comprises an approximately semi-cylindrical drum 9 having a suitably formed fading opening 10, shown herein of V-shape, although it may have other forms which will accomplish the same object. The drum 9 is mounted for rotation at a suitable point between the light 4 and the film 6, but preferably adjacent to the slit in the partition 3 as herein shown, whereby when the wider end of the opening 10 is in alignment with the slit the reproducer is operating at its maximum. For rotating the drums so as to cause the reproduction to fade out, each drum has secured to its pintle a radially extending arm 11, the free end of which is pivotally attached to a shackle 12 secured to the rod 13.

Associated with each of the rods 13 are a pair of oppositely disposed electromagnets 14, 15 and 16, 17 respectively, the rods constituting armatures mounted for sliding movement in the walls of the housings 18, 19 and 20, 21 of their respective electromagnets, each rod being adapted to be moved in one direction or the other depending upon which of its electromagnets is energized. The electromagnets 14, 15, 16 and 17 are connected with a source of current, such as a battery 22 in such manner that diagonally opposite electromagnets are energized together, a pair of push button contacts 23 and 24, normally maintained open by means of springs 25 and 26, being provided for momentarily closing the circuits through the selected electromagnets. The wire connections are as follows: Conductor 27 is connected to the negative terminal of the battery 22 and to one terminal of both the contact members 23 and 24.

The other terminal of contact member 23 is connected by a wire 28 with electromagnet 14, from which latter a wire 29 connects with electromagnet 15, and a tap wire 30 connects the wire 29 with the positive terminal of the battery. From electromagnet 15, a wire 31 leads to electromagnet 16, and a tap wire 32 connects the wire 31 with the second terminal of contact member 24. Electromagnet 16 is in turn connected by a wire 33 with electromagnet 17, and a tap wire 34 connects wire 33 with the positive terminal of the battery. From electromagnet 17 a wire 35 leads to the second terminal of contact member 23.

With the wiring above described the operation of the apparatus is as follows: With the parts in the position shown in the drawing, the shutter 9 of reproducing apparatus A is in open position, that is, with the wide end of the V shaped opening in alignment with the light slit in the partition 3, while the shutter of reproducing apparatus B is closed, that is the V shaped opening has been moved clear of its slit. Assuming now, that reproducer A is to be faded out and reproducer B faded in. To accomplish this, push-button contact 23 is pushed in so as to bridge its terminals, whereupon current will flow from battery 22 through conductor 27 and contact 23. After passing through contact 23 the current divides, a part going through wire 28, electromagnet 14, and wires 29, 30, back to battery, the remainder of the current passing through wire 35, electromagnet 17, wires 33, 34 back to battery. The electromagnets 14 and 17 thus become energized and attract their respective rod armatures 13, so that the arms 11 will be swung from the position shown in the drawing to the opposite extremity of their movement, that is, to the position where the shackles 12 abut against the electromagnet housings 18 and 21 respectively, whereby the shutter 9 of the reproducer A will be moved to closed or faded out position while that of reproducer B will be carried to open or faded in position. When another change-over is to be made, the push button contact 24 is pushed in so as to bridge its terminals, whereupon current will flow from battery 22, through conductor 27, contact 24 and wire 32, where it divides, a part going through electromagnet 16, wires 33, 34 back to battery, and the remainder passing through wire 31, electromagnet 15 and wires 39, 30 back to battery. The electromagnets 16 and 15 thus become energized and attract their respective rod armatures 13 so that the arms 11 of both shutters will be swung to the positions shown in the drawing, thereby fading out reproducer B and fading in reproducer A.

It will be obvious that only a momentary closing of the contacts 23 and 24 sufficient to energize the respective electromagnets, is required to accomplish the desired result, since, by reason of the angle formed by the arm 11 with its shackle 12 at the extremities of movement of the rod 13 it is impossible for the rod to move away from either of said extremities until attracted by the opposite electromagnet. Therefore, as soon as the desired movement has been accomplished the push button contact may be released, whereupon it will return, under the tension of its spring, to normal circuit-breaking position.

By means of the dissolver and shutter hereinbefore described, it will readily be seen that the sound records on the two film reels passing through the respective reproducers may be alternately dissolved or faded into and out of reproduction to correspond with the fading of the pictures in and out of projection.

I claim:—

1. A sound reproducing apparatus, comprising in combination, a pair of photographic sound reproducing units each having a light station and a sound record carrying film adapted to travel past said light station, and means controlling the passage of light through said stations for simultaneously fading in the record in one unit and fading out of the sound record in the other unit.

2. A sound reproducing apparatus, comprising in combination, a pair of photographic sound reproducing units each having a light station and a sound record carrying film adapted to travel past said light station, and electrically actuated means controlling the passage of light through said stations for simultaneously fading in the record in one unit and fading out of the sound record in the other unit.

3. A sound reproducing apparatus, comprising in combination, a pair of photographic sound reproducing units each having a light station and a sound record carrying film adapted to travel past said light station, a movable shutter in each of said units adapted to shut out the light from said light stations, and means for simultaneously moving the shutters thereby to fade out one sound record and fade in the other.

4. A sound reproducing apparatus, comprising in combination, a pair of photographic sound reproducing units each having a light station and a sound record carrying film adapted to travel past said light station, an oscillatory shutter in each of said units adapted to shut out the light from said light stations, and means for simultaneously oscillating the respective shutters in opposite directions thereby to fade out one sound record and fade in the other.

5. In a sound reproducing apparatus, a reproducing unit, an oscillatory shutter for controlling the passage of light through said unit, a radially extending arm rigid with said shutter, a slidable rod pivotally connected to said arm, and a pair of electromagnets adapted to attract said rod in opposite directions thereby alternately to close and open the shutter.

6. In a sound reproducing apparatus, a reproducing unit, an oscillatory shutter for controlling the passage of light through said unit, a radially extending arm rigid with said shutter, a slidable rod pivotally connected to said arm, a pair of electromagnets adapted to attract said rod in opposite directions thereby alternately to close and open the shutter, the circuits of said electromagnets being normally open, and independent manually operable means for closing said circuits.

7. In a photographic sound reproducing apparatus, a pair of reproducing units, an oscillatory shutter in each of said units for controlling the passage of light therethrough, each of said shutters having a radially extending arm rigid therewith, and electrically actuated means for synchronously oscillating the respective arms in opposite directions thereby to open one shutter and close the other.

8. In a sound reproducing apparatus, a pair of reproducing units, an oscillatory shutter in each of said units for controlling the passage of light therethrough, each of said shutters having a radially extending arm rigid therewith, a slidable rod pivotally connected to each of said arms, a pair of opposed electromagnets associated with each of said rods, the electromagnets of each pair being adapted to attract the respective rods in opposite directions and one electromagnet of each pair being in shunt circuit with the opposed electromagnet of the other pair, the circuits of said electromagnets being normally open, and independent manually operable means for closing said circuits whereby on the operation of either of said means one shutter will be moved to closed position and the other to open position.

In testimony whereof I affix my signature.

FREEMAN H. OWENS.